United States Patent
Keith et al.

(10) Patent No.: US 9,754,322 B1
(45) Date of Patent: *Sep. 5, 2017

(54) PROCEDURAL ORDER PROCESSING

(71) Applicant: PDQ Enterprises LLC, New York, NY (US)

(72) Inventors: Christopher Keith, New York, NY (US); David Randall Padgitt, Winnetka, IL (US)

(73) Assignee: PDQ Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/842,355

(22) Filed: Mar. 15, 2013

Related U.S. Application Data

(63) Continuation of application No. 13/229,054, filed on Sep. 9, 2011, now Pat. No. 8,433,644, which is a continuation of application No. 12/005,240, filed on Dec. 26, 2007, now abandoned, which is a continuation-in-part of application No. 10/329,174, filed on Dec. 24, 2002, now Pat. No. 7,315,840.

(60) Provisional application No. 60/319,045, filed on Dec. 26, 2001, provisional application No. 60/352,452, filed on Jan. 28, 2002.

(51) Int. Cl.
*G06Q 40/00* (2012.01)
*G06Q 40/04* (2012.01)

(52) U.S. Cl.
CPC .................... *G06Q 40/04* (2013.01)

(58) Field of Classification Search
CPC ........................................... G06Q 40/00
USPC ....................................... 705/36 R
See application file for complete search history.

(56) References Cited

U.S. PATENT DOCUMENTS

| | | | |
|---|---|---|---|
| 6,098,051 A | 8/2000 | Lupien | |
| 6,278,982 B1 * | 8/2001 | Korhammer et al. | 705/36 R |
| 6,829,589 B1 * | 12/2004 | Saliba | 705/36 R |
| 7,392,218 B2 * | 6/2008 | Saliba | 705/37 |
| 7,912,779 B2 * | 3/2011 | Saliba | 705/37 |

FOREIGN PATENT DOCUMENTS

| | | |
|---|---|---|
| EP | 1622078 | 2/2006 |
| EP | 1691332 | 8/2006 |

* cited by examiner

*Primary Examiner* — Kirsten Apple
(74) *Attorney, Agent, or Firm* — Brenda Pomerance

(57) ABSTRACT

A procedure is enabled to respond to an order en route to a marketplace so that the procedure can determine whether to generate a spawned order, and the spawned order is sent to a destination for execution essentially contemporaneously with the sending of the en route order to the marketplace. The spawned order can be sent to the same marketplace or a different marketplace than the en route order is sent to. The spawned orders provide additional liquidity.

30 Claims, 13 Drawing Sheets

PROCEDURAL ORDER PROCESSING

This application is a continuation-in-part of U.S. patent application Ser. No. 10/329,174, filed Dec. 24, 2002, which claims priority from U.S. provisional patent application Ser. No. 60/319,045, filed Dec. 26, 2001 and from U.S. provisional patent application Ser. No. 60/352,452, filed Jan. 28, 2002; each of these three applications has a common inventor herewith.

BACKGROUND OF THE INVENTION

The present invention relates to trading systems for improving market liquidity, and more particularly, is directed to automating generation of an order in response to order flow information.

Securities trading is a highly competitive industry. Conventionally, sophisticated traders have computers running programs for monitoring market data information and, in response thereto, automatically generating orders and sending the orders to a marketplace for execution. The computer programs enable faster response to market conditions. However, the market data information that stimulates these computer programs consists of execution prices for trades that just occurred. Thus, conventional order generation programs are always reacting to historical information.

Recently, equities began trading on major markets in decimals, hundredths of a dollar, instead of eighths of a dollar. As expected, bid-ask quote spreads have narrowed. Contrary to expectations, the increasing market transparency has resulted in a decline in the quality of markets, measured by stability and volume. It appears that the narrow spread leaves inadequate room for market makers to profitably do business.

Another concern is that electronic communication networks (ECNs) typically pay a small fee, such as $0.001 per share, to parties who provide liquidity by entering orders for storage in the ECN, and charge a larger fee, such as $0.02 per share, to parties who execute against the stored orders. In some markets, it would be preferable to reverse the cost burden.

NYFIX Millennium (www.nyfix.com) is a computer system that enables users to contribute a pool of liquidity by passing their NYSE DOT (Designated Order Turnaround) and institutional block volume through Millennium on its way to the floor of the NYSE. This pass-through volume is allowed to interact with resting orders that can improve the price reflected on the NYSE by at least $0.01. If Millennium cannot improve price, the order is immediately sent on to its original destination for execution. Millennium limits users to bidding on incoming orders. Millennium's methodology is simply to look at incoming order flow. Millennium keeps the order's originator anonymous.

Instant Forwarding is a feature of NYFIX Millennium. If an order is sent to NYFIX Millennium and is not immediately executed in the System, thereby obtaining a better price that is available on an established market, the order is instantly routed to a secondary destination predetermined by the trader. In most ECNs, if an order is not immediately executed, the order is "stranded" there, waiting for either an execution or cancellation. The problem with that scenario is that while an order is waiting in an ECN, a better price may be available in the primary market which a trader would not be able to take advantage of without first canceling his/her order.

Anonymous matching is another feature of NYFIX Millennium. Traders can expose large blocks of stock to the constant liquidity pool flowing back and forth over the NYFIX Network and be able to receive executions, with no one ever seeing their orders. An Institution will never have to reveal that it is trying to accumulate or sell a position. Throughout the post-trade and clearing stages of the execution process, buyers and sellers remain completely anonymous.

Intelligent Order Routing (IOR) is a service of NYFIX Millennium. For smaller orders, if NYFIX Millennium is unable to obtain a better price, the IOR functionality sends that order, in real-time, to the execution venue statistically most likely to improve the price. NYFIX Millennium analyzes the statistics of price improvement and expects to increase them by leveraging all the different execution points and determining, for each individual order, where the best price is usually achieved. This function provides a client with two chances at achieving a better price that the displayed national best bid or offer, first NYFIX Millennium, and second, through IOR.

NYFIX Millennium operates with two basic order types: pass-through orders and conditional orders. Pass-through orders are those that pass-through NYFIX Millennium on their way to another liquidity source, such as a primary or regional exchange, third market firm or ECN. If a match can be found within Millennium, an execution is sent back to the trader is real-time. If no match is found, the order merely "passes through" NYFIX Millennium and continues on to the predetermined destination. Conditional orders provide a mechanism for larger, institutional-size orders to be anonymously and invisibly exposed to the marketplace. Entering conditional orders into NYFIX Millennium enables traders to specify various trading conditions that will trigger an execution when particular conditions are met. Conditional orders can be crossed with pass-through or other conditional orders. NYFIX Millennium has proposed offering users the ability to place orders at the opening, closing and volume weighted average price (VWAP).

Harborside Plus (www.harborsideplus.com) is a block trading system that accepts an indication of interest (IOI) from a trader, and stores the IOI. An IOI represents a willingness to trade a particular size, with the minimum being 25,000 shares. Only the side and symbol are required, limits are optional. The actual order size is never sent. When the system identifies a match between counterparties, the buyer and seller are both notified by telephone and a negotiation begins. The Harborside Plus trading desk facilitates the negotiation, such as by providing the national best bide and offer midpoint price at the time of the match as a reference point. The buyer and seller identities remain completely confidential When the buyer and seller reach agreement, the trade is reported by Harborside Securities.

Liquid Net (www.liquidnet.com) is an alternative trading system (ATS) for buy-side institutions in the United States. Liquidnet brings natural buyers and sellers together and enables them to anonymously negotiate trades among each other, without intermediaries or information leaks. The Liquidnet system brings liquidity to the trader, reversing the current paradigm of searching for liquidity. Liquidnet offer complete anonymity—buyers' and sellers' identities are never revealed, even after a trade is completed. Liquidnet orders are matched based on quantity parameters continuously throughout the day, i.e., quantity discovery rather than price discovery. Liquidnet assumes anonymous, one-on-one negotiations that enable traders to maintain complete control of execution price and quantity.

The term "best execution" is most accurately described as delivering the execution that best suits the client's needs, that may vary from simply obtaining the best price on a single trade, to maintaining anonymity, to speed of execution, to reduction of price dis-improvement. Due to the varying and sometimes contradictory constraints imposed by traders and markets, there is room to improve the ability of order generation programs to interact with the market.

SUMMARY OF THE INVENTION

In accordance with an aspect of this invention, there is provided a method of enabling a procedure to respond to an order en route to a marketplace, comprising receiving information relating to the order that is en route to the marketplace, providing the information relating to the en route order to the procedure so that the procedure can determine whether to generate a spawned order, based upon the determination, generating the spawned order, and sending the spawned order to a destination for execution essentially contemporaneously with the sending of the en route order to the marketplace.

In accordance with another aspect of this invention, there is provided a method of routing an original order, comprising receiving, from a liquidity seeker, the original order that is en route to an order execution facility, transmitting information based on the original order to a procedure associated with a liquidity provider so that the procedure can determine whether to generate a spawned order, the liquidity seeker and the liquidity provider being different entities, and sending the original order to the order execution facility essentially contemporaneously with sending of the spawned order to a destination.

In accordance with a further aspect of this invention, there is provided a method of spawning a new order, comprising receiving, at a procedure associated with a liquidity provider, information about an original order en route to an order execution facility, determining, at the procedure, whether to spawn a new order as a function of the information about the original order and confidential data from the liquidity provider, spawning the new order when the determination is positive, and sending the new order to a destination without delay.

It is not intended that the invention be summarized here in its entirety. Rather, further features, aspects and advantages of the invention are set forth in or are apparent from the following description and drawings.

DETAILED DESCRIPTION

A procedure is a template that specifies trigger conditions and what to do when the trigger conditions occur, or do not occur within a specified time. Generally, a procedure corresponds to an order handling strategy used by a trader. A menu of standard procedures exist, and custom procedures are accommodated after being qualified for use in the present system.

An interest represents an intent to trade. In contrast, an order is a definite commitment to buy or sell a certain amount. Generally, an institution or professional trader will know that they wish to trade when conditions are right, but will not be quite ready to submit an order. The institution or trader thus represents untapped market liquidity. By representing such liquidity as interests, the liquidity can be more efficient coupled to markets.

Typically, a trader creates an interest by selecting a procedure from a menu, then supplying parameters representing what the trader wishes to trade and the conditions that will convert the general interest to a specific order. The interest is sent to a procedure processor.

The procedure processor stores interests in an interest book, stores procedures in a procedure book, and when the triggers for the procedures specified in the interests occur, the procedure processor executes the procedures to spawn orders or notifications to block trading systems of willingness to negotiate. Thus, the liquidity represented by the interests is injected into markets.

The procedure processor provides very limited communication to the trader: only execution reports and selected status reports. Accordingly, it is safe for parties to submit interests as they remain strictly confidential.

The orders spawned by the procedure processor in response to order indications are treated somewhat similar to "immediate or cancel" orders, that is, an execution report is not received within a short time, such as 100 msec, the procedure processor cancels the order. However, orders spawned in response to market data or the like may specify other behavior.

Figure 1:
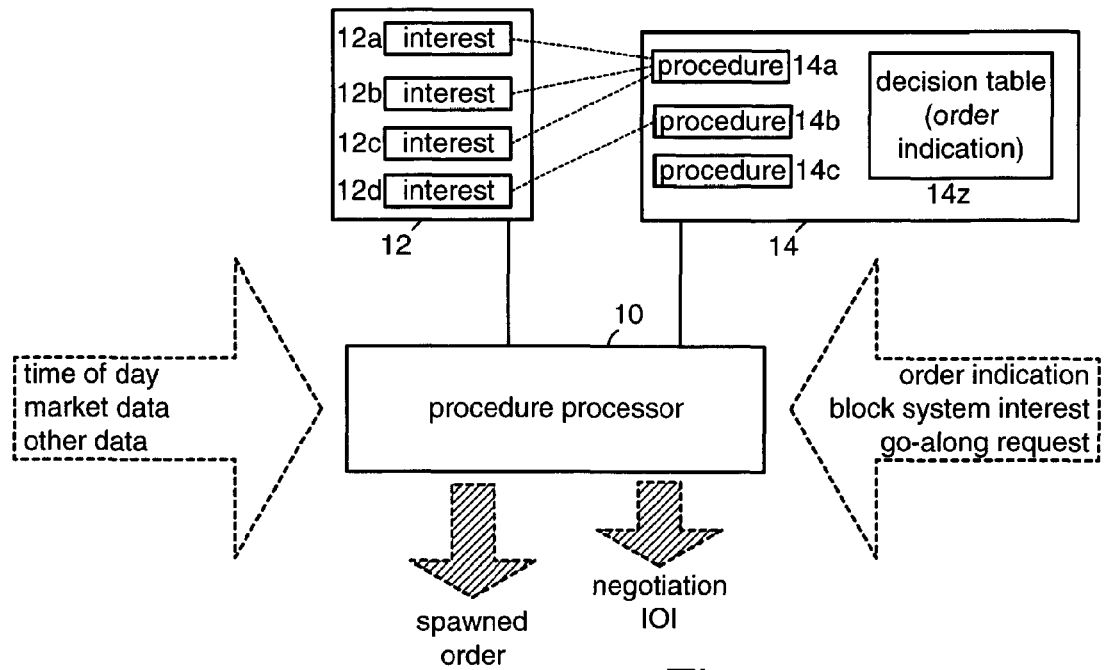
FIG. 1 is a diagram referred to in explaining the present invention.

FIG. 1 shows interest book 12 and procedure book 14 coupled to procedure processor 10. Interest book 12 contains interests 12a, 12b, 12c, 12d. Procedure book 14 contains procedures 14a, 14b, 14c and decision table 14z. Interests 12a, 12b, 12c are associated with procedure 14a. Interest 12d is associated with procedure 14b. Procedure 14c has been defined but is not being used by any interest. Decision table 14z specifies how order indications should be shown to stored interests.

Figure 2:
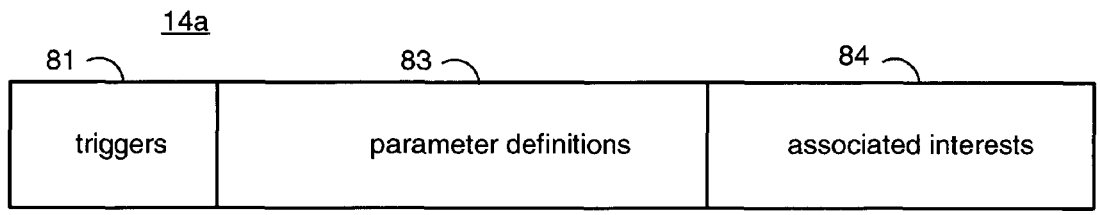
FIG. 2 is a diagram showing a procedure.

FIG. 2 shows procedure 14a having triggers section 81, parameter definitions section 83 and associated interests section 84. Triggers section 81 specifies one or more conditions that must exist for the actions section to be executed by procedure processor 10. Parameter definitions section 83 is used to define the parameters used by the procedure, such as size of spawned order, total shares in the interest, when the interest expires, and acceptable contra-parties. Contra-parties can be specified positively (ex: only broker a, broker b), negatively (ex: all except broker a, broker b) and by name or by behavior (ex: only brokers who have traded with me in the last 2 months) Associated interests section 84 identifies the interests using this procedure; initially, this section is always empty. An example of procedure 14a is shown in Table 1.

TABLE 1

| | |
|---|---|
| procedure name | procedure 14a |
| triggers | order to buy at least nn shares |
| parameters | sym = symbol of security |
| | nn = shares of incoming order |
| | m1 = maximum amount of shares per spawned sell order |
| | m2 = total amount of shares for the interest |
| | delta = maximum difference from last sale |
| | extime = expiration time |
| | contras = contra parties accepted or denied |
| associated interests | interest 12a, interest 12b, interest 12c |

Figure 3:
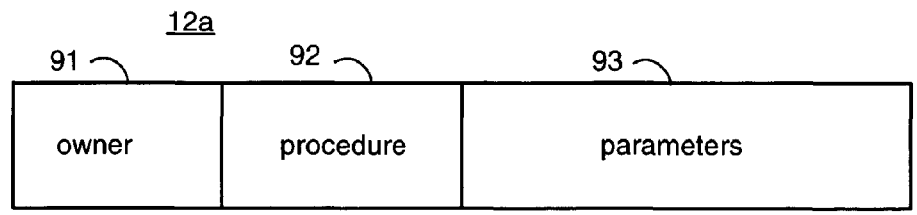
FIG. 3 is a diagram showing an interest.

FIG. 3 shows interest 12a having owner section 91, procedure section 92 and parameters section 93. Owner section 91 specifies the party who created and retains control over the interest. Procedure section 92 specifies the procedure that the interest should be associated with. Parameters section 93 specifies the parameters for the selected procedure. An example of interest 12a is shown in Table 2.

TABLE 2

| | |
|---|---|
| interest name | interest 12b |
| owner | trader 70 |
| procedure | procedure 14a |
| parameters | sym = IBM |
| | nn = 10,000 |
| | m1 = 30,000 |
| | m2 = 200,000 |
| | delta = $0.04 |
| | extime = 2003 Jan. 5, 11:30 a.m. |
| | contras = all except Broker Bluefield |

The interest defined in Table 2 says that when an buy order exists for at least 10,000 shares of IBM, then generate a sell order of up to 30,000 shares and send it to the same marketplace that the buy order is being sent to, and do this until 200,000 shares have been sold, accepting a price difference of up to four cents from the last trade, and trading with anyone except Broker Bluefield. The interest expires on Jan. 5, 2003 at 11:30 am.

It will be appreciated that many other types of procedures can be defined, and thus a huge variety of interests can be accommodated via the present interest/procedure technique.

As used herein, a "go-along request" is a communication from a specialist or market maker requesting more liquidity to complete part of a trade whose price has already been agreed upon.

Returning to FIG. 1, procedure processor 10 is responsive to several types of stimuli, corresponding to system interrupts:

1. time of day—processor 10 keeps a time-order queue of trigger conditions for stored interests, times can be specified either absolutely or relative to market open or close times;
2. market data—processor 10 receives market data from various marketplaces and can use this market data to satisfy trigger conditions for stored interests;
3. other data—processor 10 receives other data such as weather forecasts, crop predictions and so on, and can use this data to satisfy trigger conditions for stored interests;
4. order indication—processor 10 receives indications of orders that are en route to various marketplaces, and can use the order indications to satisfy trigger conditions for stored interests. Also, when processor 10 spawns an order, if the trigger was other than an order indication, then processor 10 generates an order indication for the spawned order so that waiting interests can respond to the spawned order. Additionally, a new interest willing to interact with stored interests generates an order indication;
5. block system interest—processor 10 receives indications of willingness to trade from various block systems and can use this information to satisfy trigger conditions for stored interests;
6. go-along request—processor 10 receives go-along requests and can use these requests to satisfy trigger conditions for stored interests.

Procedure processor 10 is adapted to spawn new orders when suitable trigger conditions of its stored interests are met. Procedure processor 10 also serves to generate negotiation (indications of interest) IOIs when suitable trigger conditions of its stored interests are met.

Procedure processor 10 serves to create an electronic crowd, creating competition for order fills and thus improving the quality of markets. Procedure processor 10 benefits dealers by gathering potential liquidity is a readily accessible form, and benefits brokers by providing an environment to match trading interests.

Generally, parties who submit interests are charged fees, whereas incoming order flow is charged little or no fees. This fee structure is the opposite of a conventional ECN charging policy.

A challenge for the present system is to convince traders that the system prevents improper behavior by other traders. One example of improper behavior is front-running, that is, submitting a same-side order ahead of a massive order to take advantage of the price change that will be caused when the massive order is exposed to the market. Generally, the present system enables traders to obtain information about their own interests, but not anyone else's. In some embodiments, interests cannot trigger based on same-side order indications.

Figure 4:
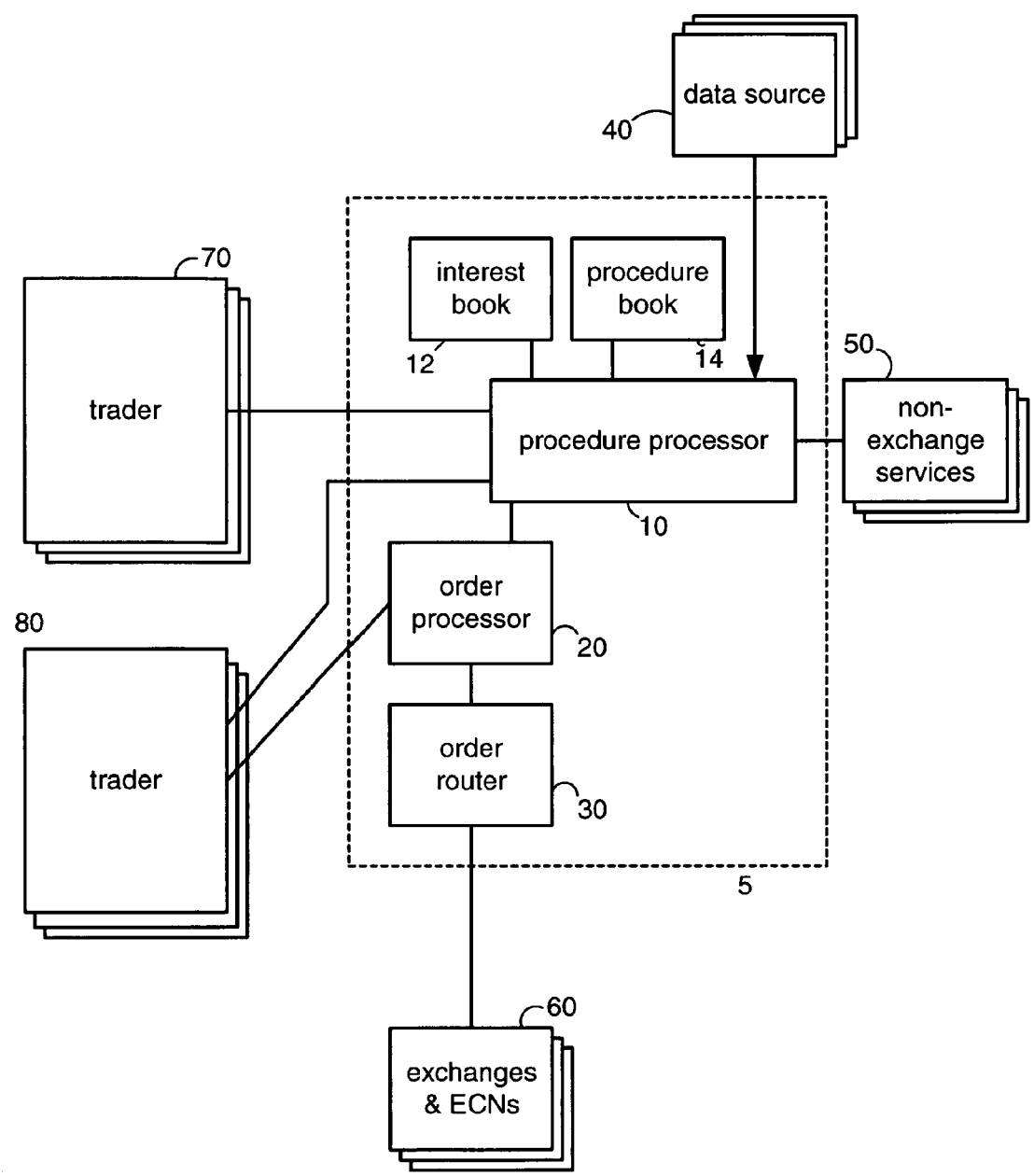
FIGS. 4-7 are block diagrams showing respective environments in which the present invention is applied.
Figure 5:
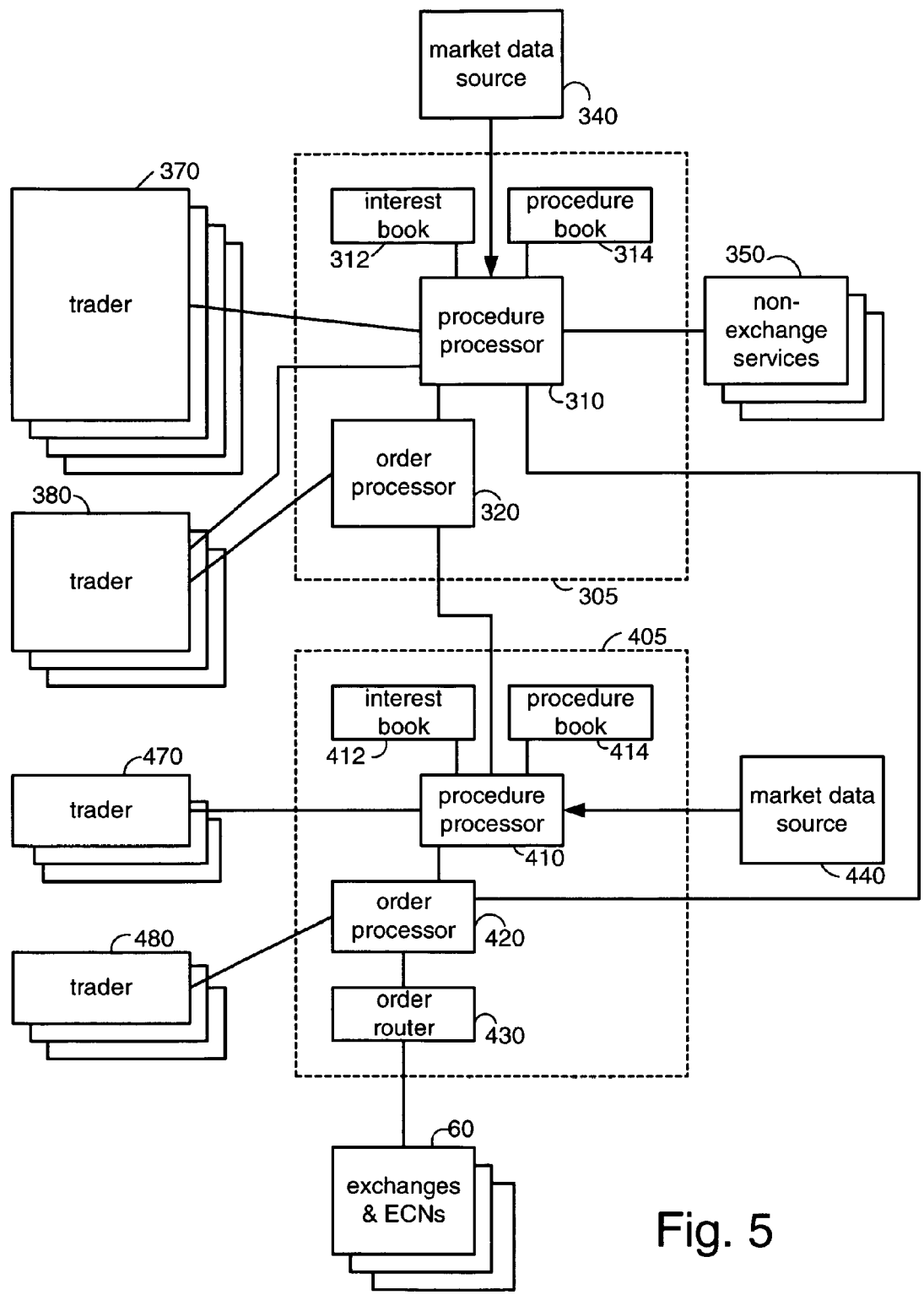
Figure 6:
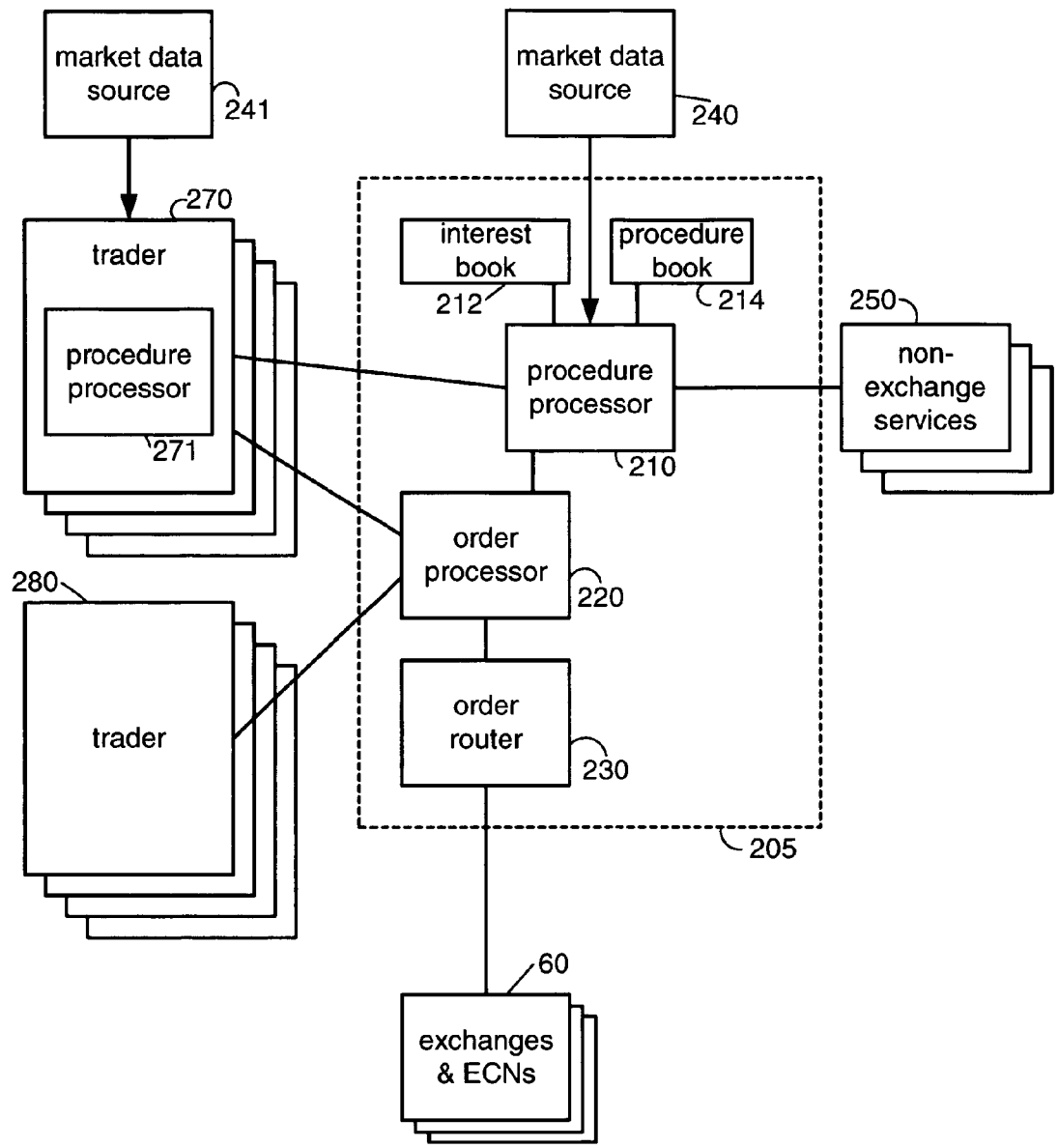
Figure 7:
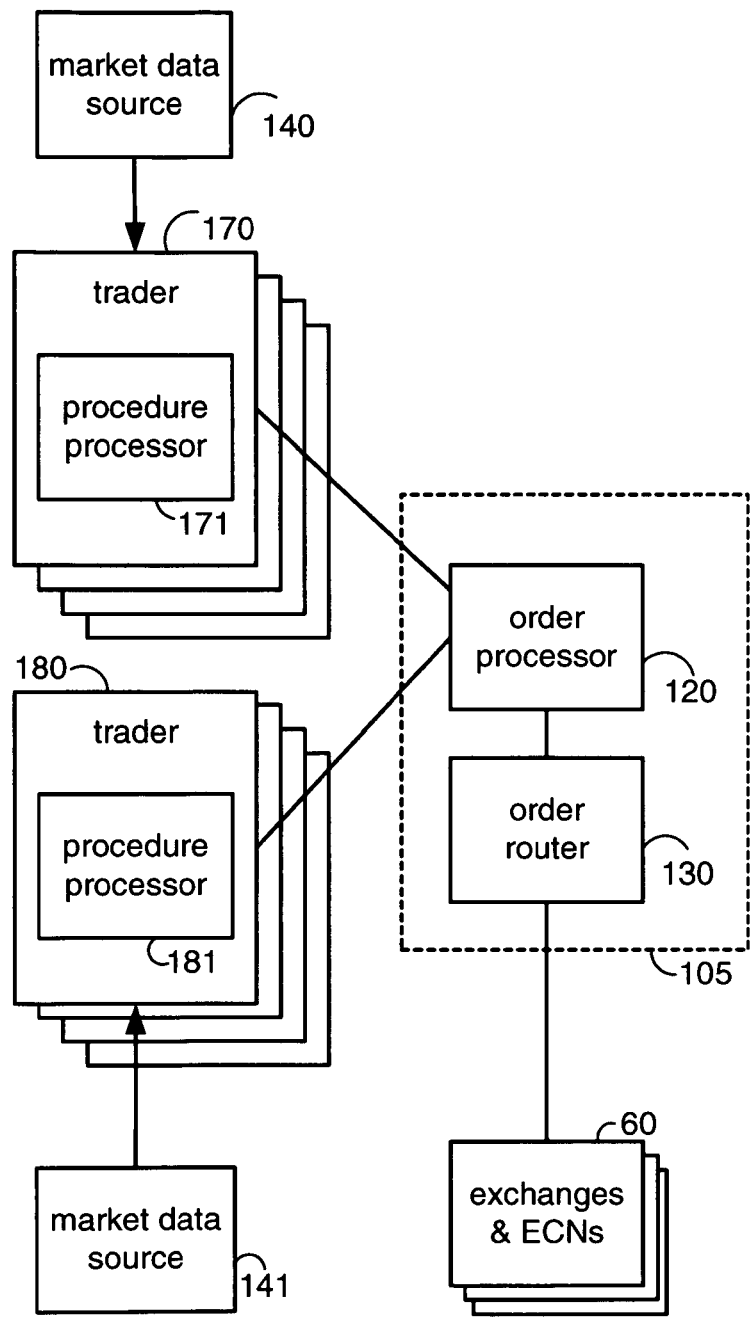

FIGS. 4-7 are block diagrams showing respective environments in which the order generation program resides. In FIG. 4, the procedure processor resides at a central location. In the embodiment of FIG. 5, the procedure processor resides at multiple central locations. In the embodiment of FIG. 6, the procedure processor resides at both the central and trader's locations. In the embodiment of FIG. 7, the procedure processor resides at an individual trader's location. In other embodiments, the procedure processor resides at the trader's location and multiple central locations.

FIG. 4 shows central location 5 comprising procedure processor 10 coupled to interest book 12 and procedure book 14, and order processor 20 that is coupled to order router 30. Each of procedure processor 10 and order processor 20 is coupled to various trader locations, shown as traders 70 and 80. Procedure processor 10 is also connected to market data source 40 and to non-exchange services 50, such as order matching services, block trading systems and the like. Order router 30 is connected to external marketplaces 60, such as stock exchanges and electronic communication networks (ECNs) able to execute orders.

Each of procedure processor 10, order processor 20 and order router 30 is shown as a separate general purpose computer appropriately programmed. In other embodiments, procedure processor 10, order processor 20 and order router 30 may execute on the same general purpose computer. In some embodiments, procedure processor 10 is actually a group of processors or virtual processors simultaneously executing similar processing but for different interests and procedures, such as one processor per procedure or one processor per interests for a trading entity.

FIG. 4 shows traders 70 and 80 coupled directly to central location 5. In some embodiments, at least one of traders 70 and 80 is connected via a communications network such as the Internet to central location 5.

Generally, trader 80 sends an order to order processor 20, which sends an order indication about the order to procedure processor 10. Order processor 20 also sends the order to order router 30 for forwarding to an execution location, such as a stock exchange or ECN.

Trader 70 sends an interest to procedure processor 10. Trader 80 is also able to send an interest to procedure processor 10. Each of traders 70 and 80 is able to submit customized procedures, such as procedure 14$b$ of FIG. 1, to procedure processor 10, and after validation, procedure 14$b$ is included in procedure book 14.

Market data source 40 and non-exchange services 50 each provide non-order information to procedure processor 10. Non-exchange services 50 may be block negotiation services, such as Harborside Plus and/or LiquidNet providing information about parties interested in trading.

It will be appreciated that some traders can enter both orders and interests, while other traders are limited to either orders or interests.

FIG. 5 is somewhat similar to FIG. 4 and, for brevity, generally corresponding elements will not be discussed. In the embodiment of FIG. 5, central locations 305 and 405 have respective procedure processors 310 and 410. Order processors 320 and 420 are respectively coupled to procedure processors 410 and 310. Each central location appears to be a trader, from the perspective of the other central location. The external interfaces at one central location are thus available to the other central location, with no configuration changes required at the external interfaces.

FIG. 6 is somewhat similar to FIG. 4 and, for brevity, generally corresponding elements will not be discussed. In the embodiment of FIG. 6, procedure processor 210 resides at central location 205, and trader 270 has elected to also implement local procedure processor 271. In this embodiment, trader 270 retains its interests that depend on conditions ascertainable from market data source 241, so as to avoid the fees associated with using procedure processor 210 to execute these interests.

FIG. 7 is somewhat similar to FIG. 4 and, for brevity, generally corresponding elements will not be discussed. In the embodiment of FIG. 7, procedure processors 171 and 181 are located at the trader site. Interests are submitted by a trader to his/her respective procedure processor. Only the trader's own order flow is accessible to procedure processors 171, 181, and so the trader's interests are responsive to a much smaller segment of market interest than in the embodiment of FIG. 4. In some embodiments, at least one of traders 170 and 180 is coupled to a non-exchange service, and then the respective procedure processor is able to accommodate interests for negotiation. However, each trader has to configure its own interface, whereas in the embodiment of FIG. 4, new interfaces can be accommodated without configuration changes at the trader location.

Figures 8, 9:
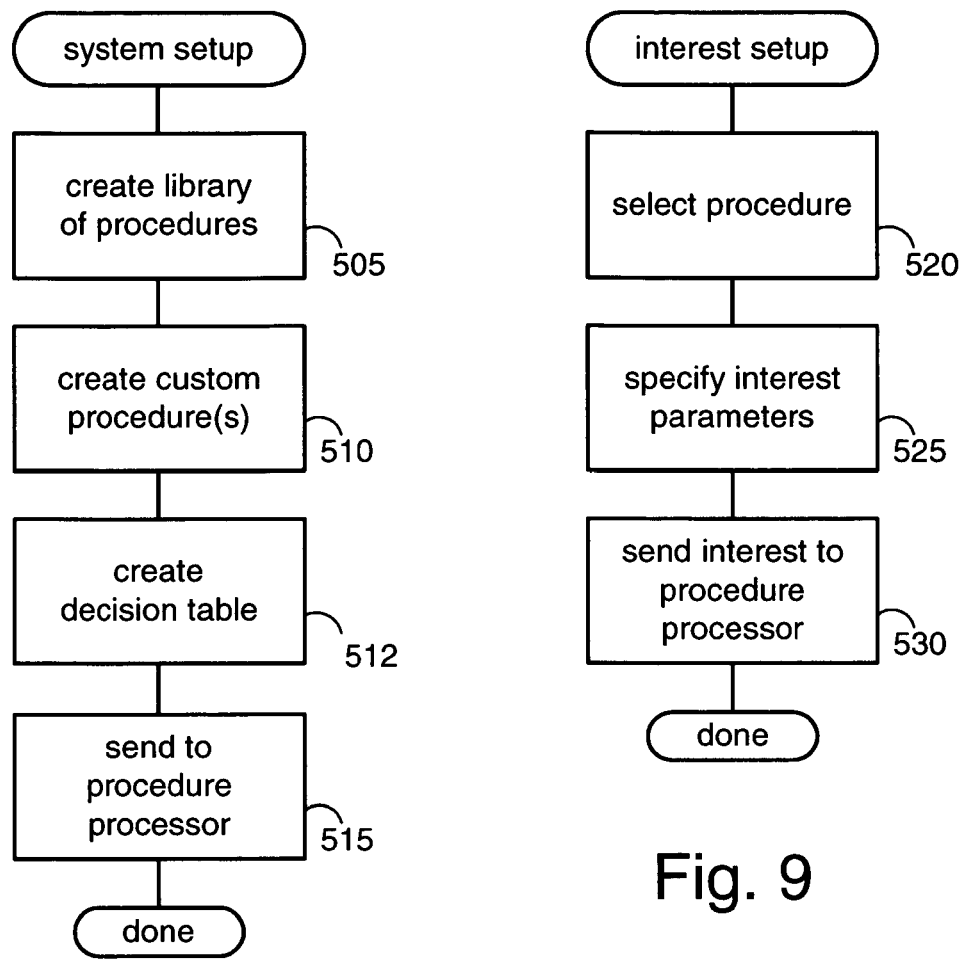
FIGS. 8 and 9 are flowcharts referred to in explaining a setup phase.

FIGS. 8 and 9 are flowcharts referred to in explaining a setup phase.

As shown in FIG. 8, during system setup, at step 505, a library of procedures is created. At step 510, custom procedures are created. Library procedures and custom procedures may also be created during operation of procedure processor 10. At step 512, decision table 14$z$ of FIG. 1 is created. More specifically, each party whose orders will generate order indications for procedure processor 10 specifies how waiting interests should receive the order indication. As an example, one trader may provide an ordered list of contra-parties, specifying that its order indications will be shown to interests from the first contra, then to interests from the second contra and so on. At step 515, the library procedures, custom procedures and decision table are sent to procedure processor 10 for installation therein.

FIG. 9 depicts interest setup, that is, how a trader creates an interest. At step 520, the trader selects a procedure from a menu of library and authorized custom procedures. At step 525, the trader specifies appropriate parameters for the selected procedure. At step 530, the trader sends the interest to procedure processor 10.

Figure 10:
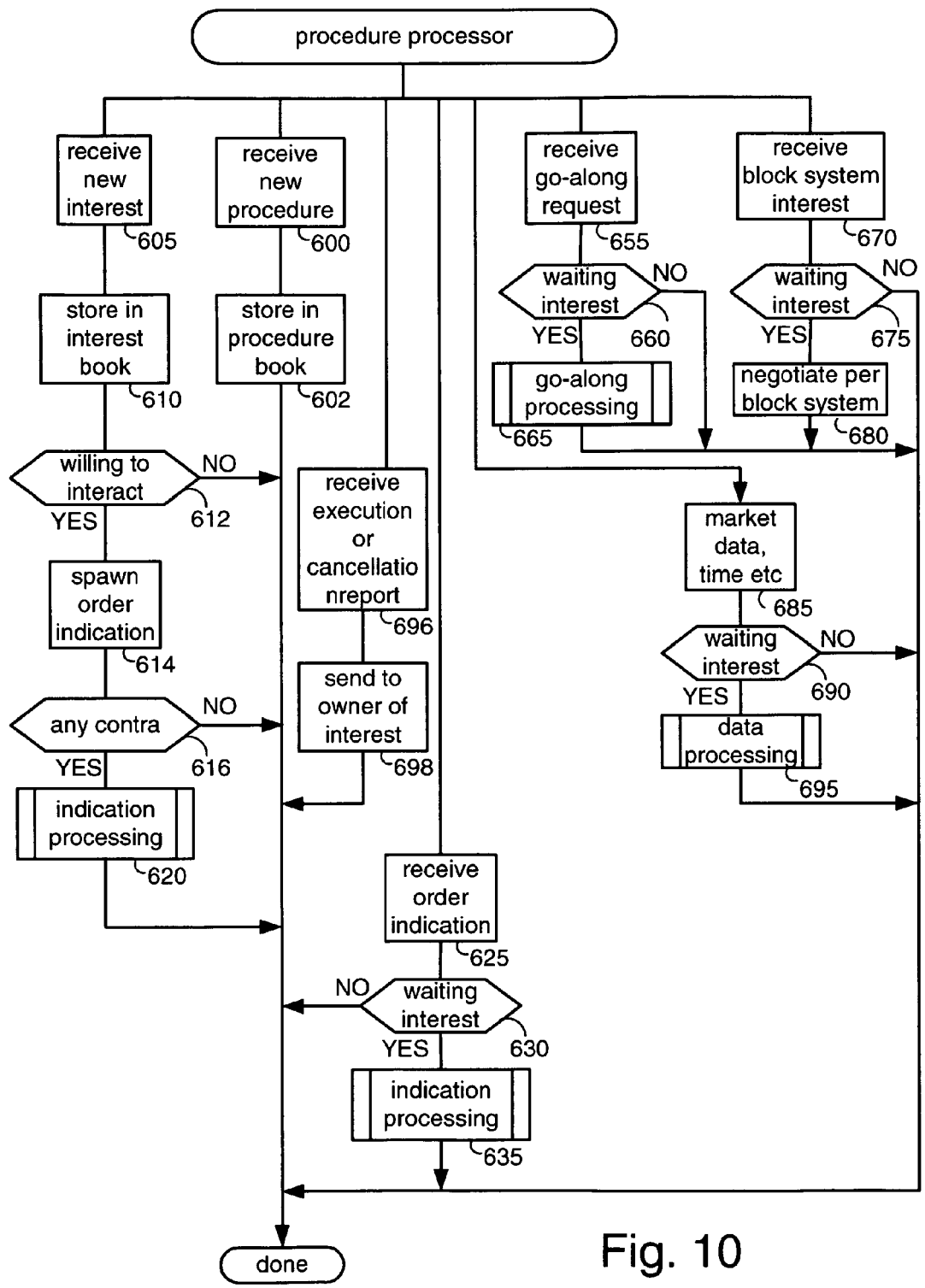
FIGS. 10 and 11 are flowcharts showing operation of a procedure processor according to the present invention.
Figure 11:
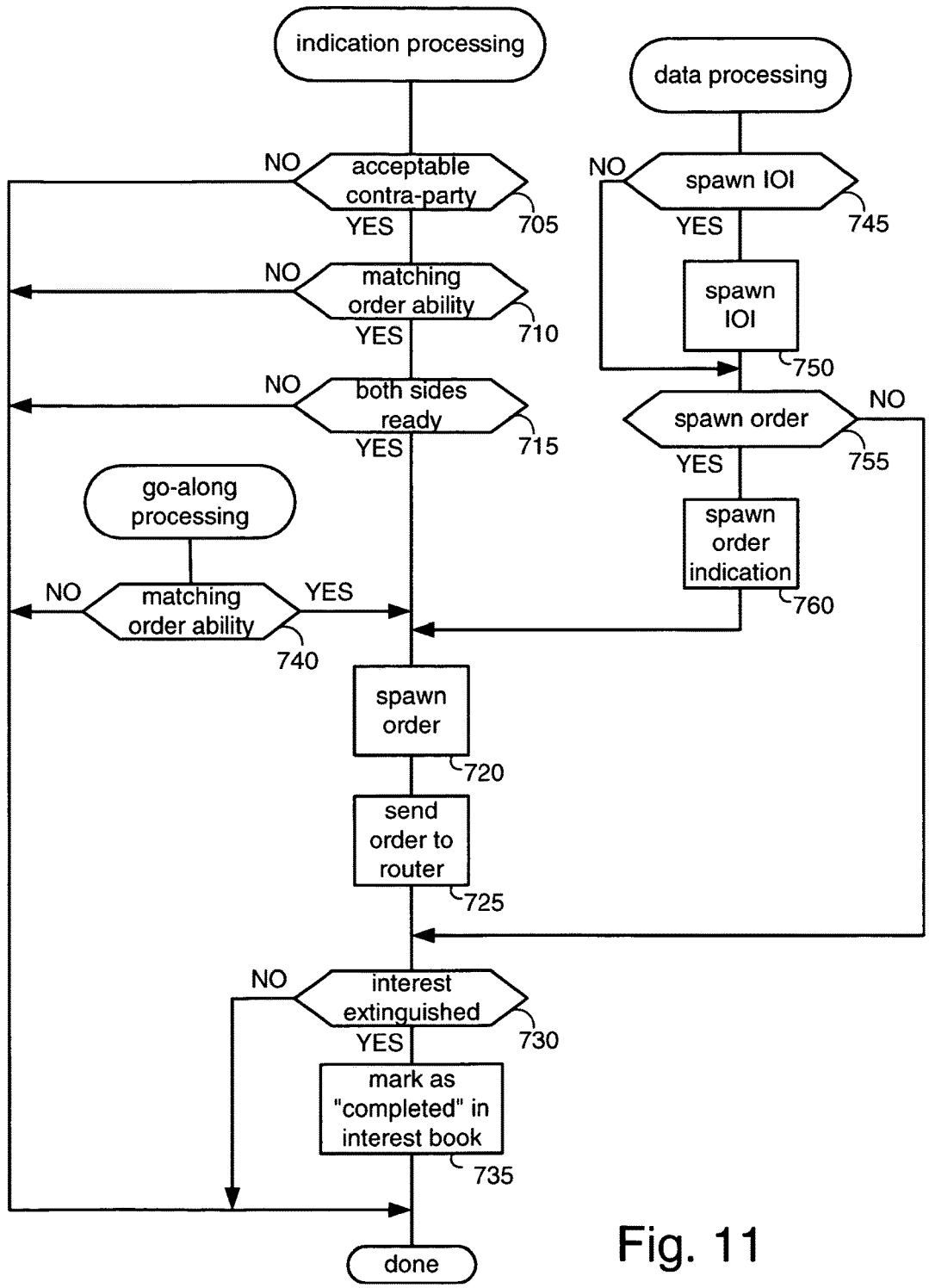

FIGS. 10 and 11 are flowcharts showing operation of procedure processor 10. As shown in FIG. 10, procedure processor 10 typically waits to receive information, then determines which interests want to receive the information and supplies the information thereto. As shown in FIG. 11, after the information has been used to trigger the procedure associated with the interest, procedure processor 10 executes the procedure to determine whether to spawn an order, and possibly an interest indication for unmatched spawned orders, or a negotiation IOI.

Turning to FIG. 10, procedure processor is adapted to receive a new procedure (step 600), a new interest (step 605), an order indication (step 625), a go-along request (step 655), a block system interest (step 670), market data, other data and time information (step 685), and an execution report for a spawned order (step 696).

At step 600, a new procedure is received. At step 605, procedure processor 10 stores the new procedure in procedure book 14.

At step 605, a new interest is received. At step 610, procedure processor 10 stores the new interest in interest book 12. If the interest indicates it is willing to interact with other interests, then at step 614, processor 10 spawns an order indication. At step 616, processor 10 checks if contra-interests are found, and if so, at step 620, executes indication processing (see step 705 of FIG. 11) for the new interest.

At step 625, an order indication is received. At step 630, procedure processor 10 checks whether there are any interests waiting to be triggered by the order indication, and if so, processor 10 uses decision table 14$z$ to find which interests and procedures to trigger. At step 635, processor 10 performs indication processing (see step 705 of FIG. 11) for each of the triggered interest/procedures.

At step 655, a go-along request is received from a specialist or market-maker. At step 660, procedure processor 10 checks whether there are any interests waiting to be triggered by the go-along request, and if so, processor 10 uses decision table 14$z$ to find the order in which to trigger the waiting interests. At step 665, processor 10 performs go-along processing (see step 740 of FIG. 11) for each of the triggered interest/procedures.

At step 670, a block system interest is received from a third party system. At step 675, procedure processor 10 checks whether there are any interests waiting to be triggered by the block system interest, and if so, processor 10 triggers the waiting interests. At step 680, processor 10 performs negotiation in accordance with the external system. For example, Harborside Plus has a trading desk with personnel that speak to the human buyer and seller.

At step 685, non-order information such as market data, time data or other data is received. At step 690, procedure processor 10 checks whether there are any interests waiting to be triggered by the non-order information, and if so, processor 10 triggers the waiting interests. At step 695, processor 10 performs data processing (see step 745 of FIG. 11) for each of the triggered interest/procedures.

At step 696, processor 10 receives an execution report or a cancellation report for a spawned order, and at step 698, processor 10 forwards the execution report or cancellation report to the owner of the interest associated with the spawned order.

FIG. 11 shows the indication processing, data processing, and go-along processing referenced in FIG. 10.

Indication processing will now be described. At step 705, procedure processor 10 checks whether the contra-party is acceptable, and if so, at step 710, checks whether the instant interest has the ability to create a matching order; generally, this is equivalent to checking whether the interest has sufficient quantity. If so, at step 715, processor 10 checks whether both sides are ready. In the case of an order indication, the contra side is always ready. In the case of an interest indication, that is, a newly arrived interest, step 715 is a checkpoint as to whether both sides accept each other. If all tests are positive, then at step 720, procedure processor 10 spawns a new order and at step 725, sends the order to order router 30 via order processor 20. Next, at step 730, processor 10 checks whether the interest has been extinguished, and if so, at step 735, marks the interest as "completed" in interest book 12.

It will be appreciated that the execution report for the spawned order is received at step 696 of FIG. 10.

Go-along processing comprises checking, at step 740, whether the interest has sufficient quantity to create a matching order, and if so, continuing processing at step 720.

Data processing comprises checking, at step 745, whether the market data, time data or other data has triggered the need to negotiate, and if so, at step 750, spawning a negotiation IOI or other suitable message in accordance with the interface of the external negotiation system. Negotiation occurs in the external system, or according to the methodology of the external system. If negotiation is not required or after spawning the negotiation IOI, at step 755, processor 10 checks whether the received data has triggered the need to spawn an order. If so, at step 760, an order indication is sent to procedure processor 10. That is, the spawned order is not matched to an existing order, so other interests may want to provide contra-side liquidity, and are given the opportunity to do so by the spawned order indication. Processing continues at step 720.

A first exemplary use will now be described. Let it be assumed that trader 70 uses procedure 12b, shown in Table 3, to create interest 12d, shown in Table 4.

TABLE 3

| | |
|---|---|
| procedure name | procedure 14b, cleanup |
| triggers | order to sell at least nn shares |
| parameters | sym = symbol of security |
| | nn = shares of incoming order |
| | m1 = maximum amount of shares per spawned buy order |
| | m2 = total amount of shares for the interest |
| | price = CLEANUP |
| | extime = expiration time |
| | contras = contra parties accepted or denied |
| associated interests | interest 12d |

TABLE 4

| | |
|---|---|
| interest name | interest 12d |
| owner | trader 70 |
| procedure | procedure 14B |
| parameters | sym = GRPN |
| | nn = 100 |
| | m1 = 25,000 |
| | m2 = 25,000 |
| | price = CLEANUP |
| | extime = when shares traded |
| | contras = all |

Procedure 14b uses an arbitrarily defined "cleanup" strategy, sometimes referred to as a "ride" strategy. The cleanup strategy looks at the quote (order book) in the best external market, and determines for the contra-side, the best size, the best price, the next-best size and the next-best price. The cleanup strategy spawns an order at a price equal to the contra next-best price offset by the minimum price difference, and having size equal to the lesser of (a) the amount of the interest remaining to be executed less the contra best size, and (b) the amount of the order indication less the contra best size.

Assume that order indication 1112 (not shown) is sent to procedure processor 10. Order indication 1112 is as follows: SELL 6,500 GRPN @ 13.70. Assume that the best market quote is: BID 1000 @ 13.85, 2000 @ 13.82, 1500 @ 13.77, 5000 @ 13.74. Without procedure processor 10, the order for order indication 1112 would be executed at the following price per share:

$$(1000*13.85+2000*13.82+1500*13.77+2000*13.74)/6500=13.79$$

However, procedure processor 10 notifies interest 12d of order indication 1112. Interest 12d is triggered by the existence of order indication 1112 to spawn a new order 1113 (not shown) that is matched to the order for order indication 1112. The price for order 1113 is computed as the next-best price (13.82) plus the minimum increment (0.01), namely 13.83. The size of order 1113 is computer as the lesser of (25,000-1,000) and (6,500-1,000), namely, 5,500 shares. Order 1113 is: BUY 5,500 GRPN @ 13.83.

Procedure processor 10 sends spawned order 1113 to order processor 20 for forwarding to the execution market of the order indicated in order indication 1112. With procedure processor 10, the order for order indication 1112 is executed at the following price per share:

$$(1000*13.85+5500*13.83)/6500=13.83$$

From the viewpoint of the order for order indication 1112, being exposed to procedure processor 10 has resulted in a price improvement of (13.83-13.79)=0.04 per share, at no charge to the order.

A second exemplary use is as follows. Assume interest 12d and a best market quote as above. Trader 80 submits interest 12e shown in Table 5 to procedure processor 10.

TABLE 5

| | |
|---|---|
| interest name | interest 12e |
| owner | trader 80 |
| procedure | procedure 14a |
| parameters | sym = GRPN |
| | nn = 100 |
| | m1 = 10,000 |
| | m2 = 10,000 |
| | delta = market |
| | extime = when shares traded |
| | contras = only trader 70 |

Upon receiving interest 12e, procedure processor 10 exposes it to interest 12d and determines that interest 12d should spawn order 1114 as follows:
BUY 9,000 GRPN @ 13.83
and that interest 12e should spawn order 1224 as follows:
SELL 10,000 GRPN @ MARKET
Procedure processor 10 sends order 1115 and order 1224 to order processor 20 for forwarding to order router 30 and thence to the best external market. With procedure processor 10, order 1224 is executed at the following price per share:

(1000*13.85+9000*13.83)/10000=13.83

A third exemplary use is as follows. A "fast execute" procedure is defined with a trigger of "check all external markets for a specified price" and an action of "immediately hit the price for up to xx remaining shares". The fast execute procedure can manage orders. Here, procedure processor 10 monitors other markets on behalf of the interests associated with the fast execute procedure.

A fourth exemplary use is as follows. A go-along procedure, procedure 14c, is defined as shown in Table 6 with an associated interest 12f shown in Table 7. Here, if Market Maker Jones requests a buy order for up to 10,000 shares, interest 12f spawns a buy order for 10,000 shares to be part of a trade that has already been priced on an exchange floor.

TABLE 6

| | |
|---|---|
| procedure name | procedure 14c, go-along |
| triggers | go-along request from CONTRA for SIDE for SYM for (nmin, nmax) shares |
| parameters | SYM = symbol of security<br>nmin = minimum shares of go-along request<br>nmax = maximum shares of go-along request<br>m1 = maximum amount of shares per spawned same-side order<br>m2 = total amount of shares for the interest<br>price = GO-ALONG<br>extime = expiration time<br>contras = contra parties accepted or denied (specialists or market makers only) |
| associated interests | interest 12f |

TABLE 7

| | |
|---|---|
| interest name | interest 12f |
| owner | trader 70 |
| procedure | procedure 14c |
| parameters | side = BUY<br>sym = GRPN<br>nmin = 100<br>nmax = 10,000<br>m1 = 100<br>m2 = 80,000<br>price = GO-ALONG<br>extime = 2003 Jan. 30, 4 pm<br>contras = only Jones |

Differences between the present system and NYFIX Millennium are set forth in Table 8.

TABLE 8

| Design Feature | Present System | NYFIX Millennium |
|---|---|---|
| Fundamental Character | is basically an "interests" integration mechanism. Reacting to ordinary order flow is just 1 of 5 tools its customers have. Allows institutional interests to find other institutional interests while remaining both undisplayed, and completely confidential and while seeing potentially 'all' order flow | are one-dimensional price improvement methodologies applied to orders which are passed through them |
| Business Strategy | does not compete with any current service. Generates orders to be executed elsewhere. Makes market reintegration for institutional orders an achievable goal because it adds value to all links, and is non-competitive | compete for order flow and compete with exchanges |
| Technology | is an open platform allowing the user to employ any trading style and any technology. Makes systematized trading style competition practical for all users. Does not require firms to change prove approaches. | restrict the user to a narrow range of system provided options |
| Order Execution | provides pairing of orders which may be executed by either electronic or manual methods. Establishes a fully neutral methodology which can find liquidity whether electronic or on Exchange floors | provide pairing for execution in electronic methodologies only |
| Business Relationships | allows for the maintenance of distinctive inter-firm relationships. Leverages relationships in place and enables development of "electronic" relationships that can be key to profitability | treat the bidding crowd as monolithic |
| Ease of Access | users do not need to make any change in trading, or order routing to get value added. Eliminates major operational changes, either trading or routing, so not looking for more liquidity is hard to rationalize | order routers must reroute orders to the system to get value |
| Revenue Model | free to the users of liquidity, the "interests" pay. Eliminates the inappropriateness of charging customers added fees for best execution | users of liquidity in systems pay for price improvement |

Figure 12:
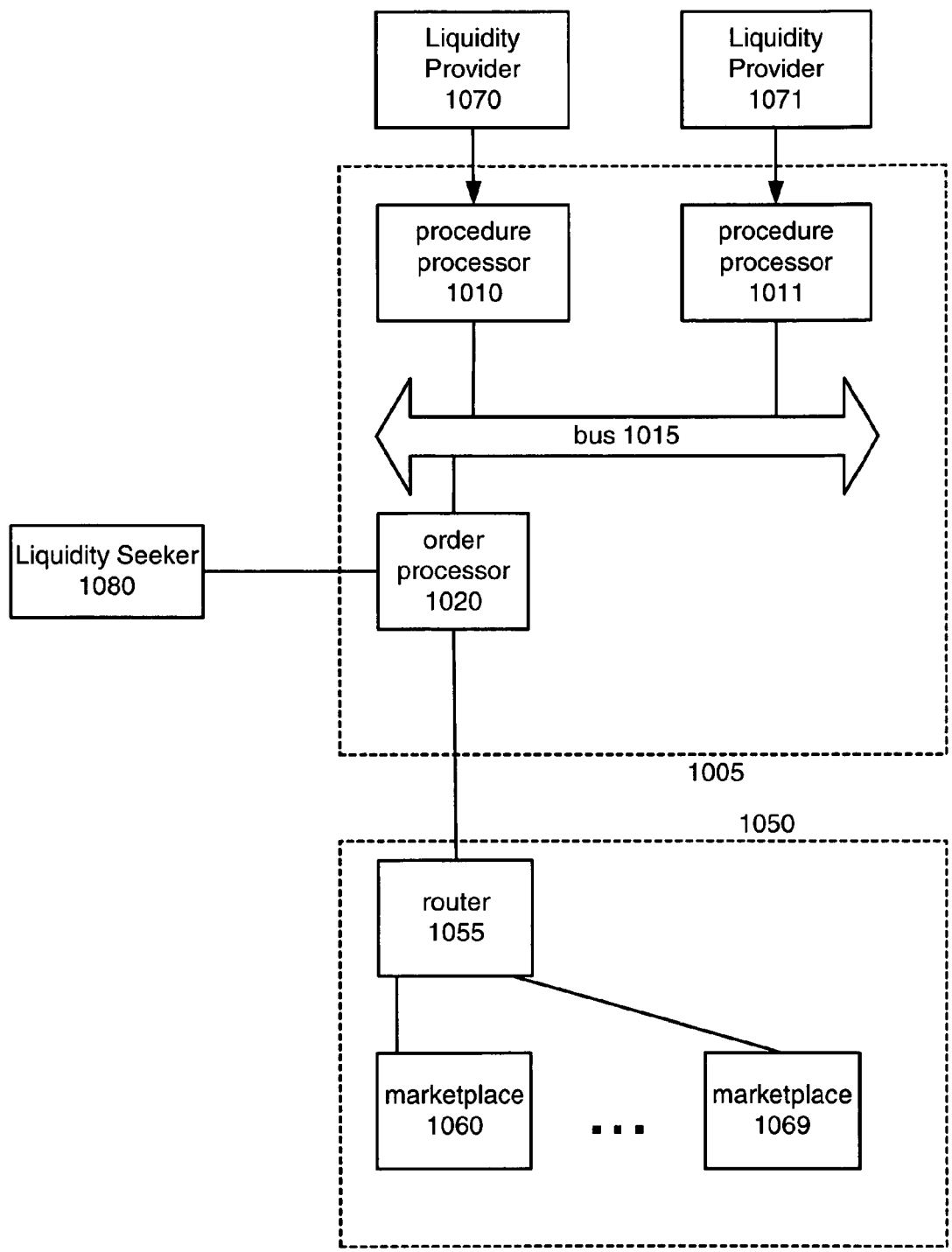
FIG. 12 is a block diagram referred to in explaining the present invention.

FIG. 12 is a block diagram showing procedure processing system 1005, liquidity providers 1070, 1071, liquidity seeker 1080 and exchange or ECN 1050. Procedure processing system 1005 includes order processor 1020, bus 1015, and procedure processors 1010, 1011. Exchange or ECN 1050 includes order router 1055 and marketplaces 1060-1069. Each of marketplaces 1060-1069 specializes in its own respective type of security, such as XYZ stock, YZA stock, XYZ options, XYZ futures and so on. The software associated with each of marketplaces 1060-1069 may be associated with respectively separate hardware (computers and communication facilities) or may be associated with shared hardware.

As used herein and in the claims, a marketplace is an entity, such as a person or system, that is legally authorized by a government regulatory body to match buy and sell orders to create a trade that the parties are obligated to fulfill. For purposes of this definition, a system comprises hardware and/or software.

Generally, liquidity seeker 1080 sends an order, referred to as the original or liquidity seeking order, to marketplace 1060 via procedure processing system 1005.

As used herein and in the claims, an order is en route to a marketplace when the sender of the order has launched the order on its way to a marketplace for execution, the launch being from an electronic system. When a retail customer sends an order to a broker, the order is not yet en route to a marketplace because a broker is not a marketplace. When a broker sends its customer's order to an exchange or ECN, the order is en route to a marketplace because an exchange or ECN typically comprises an order routing facility and at least one marketplace.

As used herein and in the claims, a procedure is not at a marketplace when the procedure operates in the primary interest of an entity other than the marketplace. For example, when a procedure is operated by a market-maker at the marketplace for the market-maker's own account, then the procedure is not at the marketplace even if the procedure operates on facilities provided by the marketplace and/or the procedure is located on the marketplace premises.

In one embodiment, procedure processing system 1005 delays the original order by a predetermined short time period; hopefully, the presence of the original order causes responsive orders, also referred to as contra-side orders or spawned orders, to be spawned. System 1005 sends the spawned orders to marketplace 1060 during the predetermined short time period for which the original order is delayed. Accordingly, when the original order arrives at marketplace 1060, additional liquidity in the form of the spawned orders is present. Thus, to liquidity seeker 1080, a disadvantage of system 1005 is that the original order experiences a delay, but an advantage of system 1005 is that when the original order finally arrives at marketplace 1060, there is generally more liquidity (contra-side orders) than would exist without system 1005.

In another embodiment, system 1005 does not delay the original order. In this embodiment, additional liquidity arrives at marketplace 1060 shortly after the original order but in time to be reasonably likely relevant to the trading process experienced by the original order.

In a further embodiment, system 1005 enables procedure processors 1010, 1011 to chose a destination marketplace for a spawned order that is not necessarily the same as the marketplace for the original order.

As used herein and in the claims, sending a spawned order substantially contemporaneously with sending of the original order means sending the spawned order in a timeframe such that there is a reasonable likelihood that the spawned order participates in the matching process for the original order at the marketplace, when the spawned order and the original order are sent to the same marketplace. A spawned order may not be matched with the original order for a variety of reasons, such as: the quantity summed over the spawned orders exceeds the quantity of the original order, or the original order is matched with an order at the marketplace from a source other than system 1005. When the spawned order and the original order are sent to different marketplaces, then "substantially contemporaneously" is a time period that is approximately equal to the time period that would be considered substantially contemporaneous if the spawned order and the original order are sent to the marketplace that the original order is sent to.

Turning to the components of system 1005, order processor 1020 and procedure processors 1010, 1011 are each general purpose processors programmed to operate in accordance with the present invention. Each of order processor 1020 and procedure processors 1010, 1011 executes a respective stored procedure to form a respective running procedure that acts in accordance with the present invention. The procedure executed by procedure processor 1010 is confidential to liquidity provider 1070, is operated for the benefit of liquidity provider 1070; and liquidity provider 1070 is legally responsible for the trade-related actions of procedure processor 1010, such as spawned orders. Similarly, the procedure executed by procedure processor 1011 is confidential to liquidity provider 1071, is operated for the benefit of liquidity provider 1071; and liquidity provider 1071 is legally responsible for the trade-related actions of procedure processor 1011, such as spawned orders.

Confidentiality of a procedure arises from at least one of the following: (a) the values (numeric information) and/or parameters (non-numeric information) are known only to the liquidity provider that provides them, (b) the details of how the procedure operates, referred to as its methodology, are known only to the liquidity provider, and (c) the values produced by the procedure are known only to system 1005. For example, if a predefined set of procedures is available for running on procedure processor 1010, the selected procedure is confidential if the identity of the selected procedure running on procedure processor 1010 is known only to liquidity provider 1070. As another example, even if the methodology of the procedure running on procedure processor 1010 is known, the procedure is confidential if the values used by the procedure are known only to liquidity provider 1070.

Bus 1015 is a group of wired or wireless connections enabling data to be exchanged among processors 1010, 1011 and 1020 at high speed. For example, processors 1010, 1011, 1020 may be so-called blade servers that are plugged into a high-speed backplane serving as bus 1015.

Procedure processor 1010 receives data from liquidity provider 1070. Procedure processor 1010 is prevented from sending information back to liquidity provider 1070, except for data relating to acknowledgement of messages, requests to retransmit messages and other protocol-level communications, and status reports relating to procedure processor 1010. Effectively, there is a one-way communications link between liquidity provider 1070 and procedure processor 1010, that prevents liquidity provider 1070 from learning about events occurring at system 1005 such as arrival of liquidity seeking orders and responses from other procedure processors, such as procedure processor 1011.

Procedure processor 1010 executes a procedure, also referred to as a running procedure, that receives information from liquidity provider 1070 and uses the information to provide order related information to order processor 1020, according to a variety of techniques, some of which are discussed below. The order related information from procedure processor 1010 may be provided in response to information from order processor 1020, or may be provided from time to time as procedure processor 1010 determines that such information should be provided. The examples below provide further clarification.

Procedure processor 1011 is similar to procedure processor 1010, except that the procedure executed by procedure processor 1011 is likely to be different than the procedure executed by procedure processor 1010, and procedure processor 1011 receives information from liquidity provider 1071 instead of 1070. Since each of liquidity providers 1070, 1071 has their own procedure processor, the execution of their respective procedures occurs independently, that is, the procedures are isolated from each others' operation. This is advantageous, as one liquidity provider may use computation intensive procedures that take a long time to execute, while another liquidity provider can use a quicker procedure that is not slowed by the computation intensive procedure. Additionally, the liquidity providers can send data to their procedures at their own preferred rates, without interference from each other.

System 1005 is useful to a liquidity provider in, inter alia, the following situations. First, a liquidity provider may wish to buy or sell a very large amount of a security, so large that if others knew of this quantity, it would adversely affect the market price. By using system 1005, the liquidity provider can buy or sell partial amounts of the very large amount, and only in response to contra-side activity that occurred without knowledge of the existence of the very large amount, thereby avoiding adverse pricing. Second, the liquidity provider may wish to frequently trade without the market being aware of the price at which the liquidity provider is willing to trade.

Order processor 1020 generally receives an order from liquidity seeker 1080 that is en route to marketplace 1080, and after a short delay, forwards the order to marketplace 1080. Additionally, order processor 1020 informs procedure processors 1010, 1011 of the existence of the liquidity seeking order. Further, order processor 1020 forwards any orders spawned by processors 1010, 1011 to marketplace 1060. In some embodiments, order processor 1020 automatically generates a cancellation for the spawned orders in a predetermined time after sending the spawned orders to marketplace 1060, ensuring that if the spawned order is not quickly executed at marketplace 1060, then it is cancelled.

Figure 13:
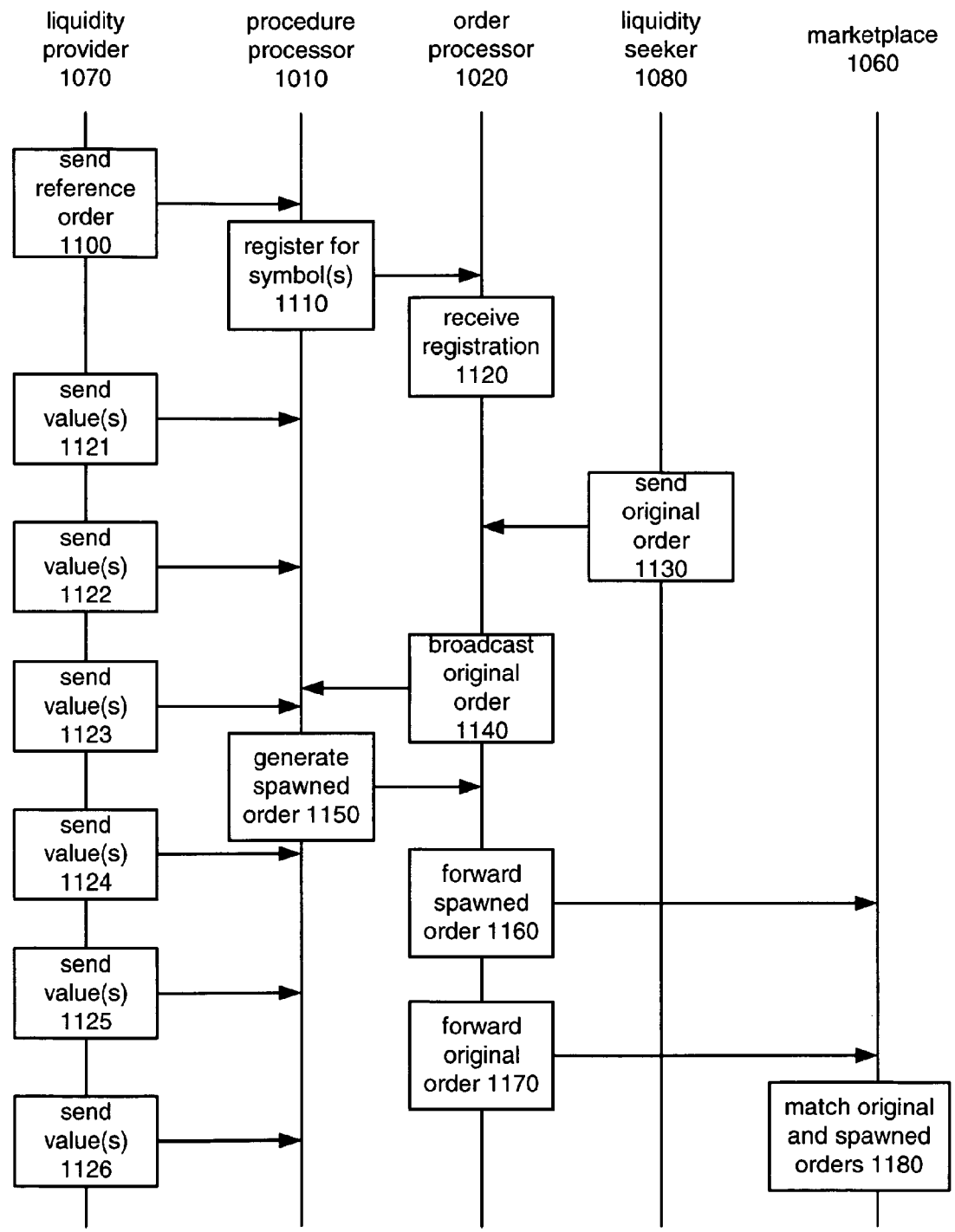
FIGS. 13-16 are flowchart referred to in explaining embodiments of the present invention.
Figure 14:
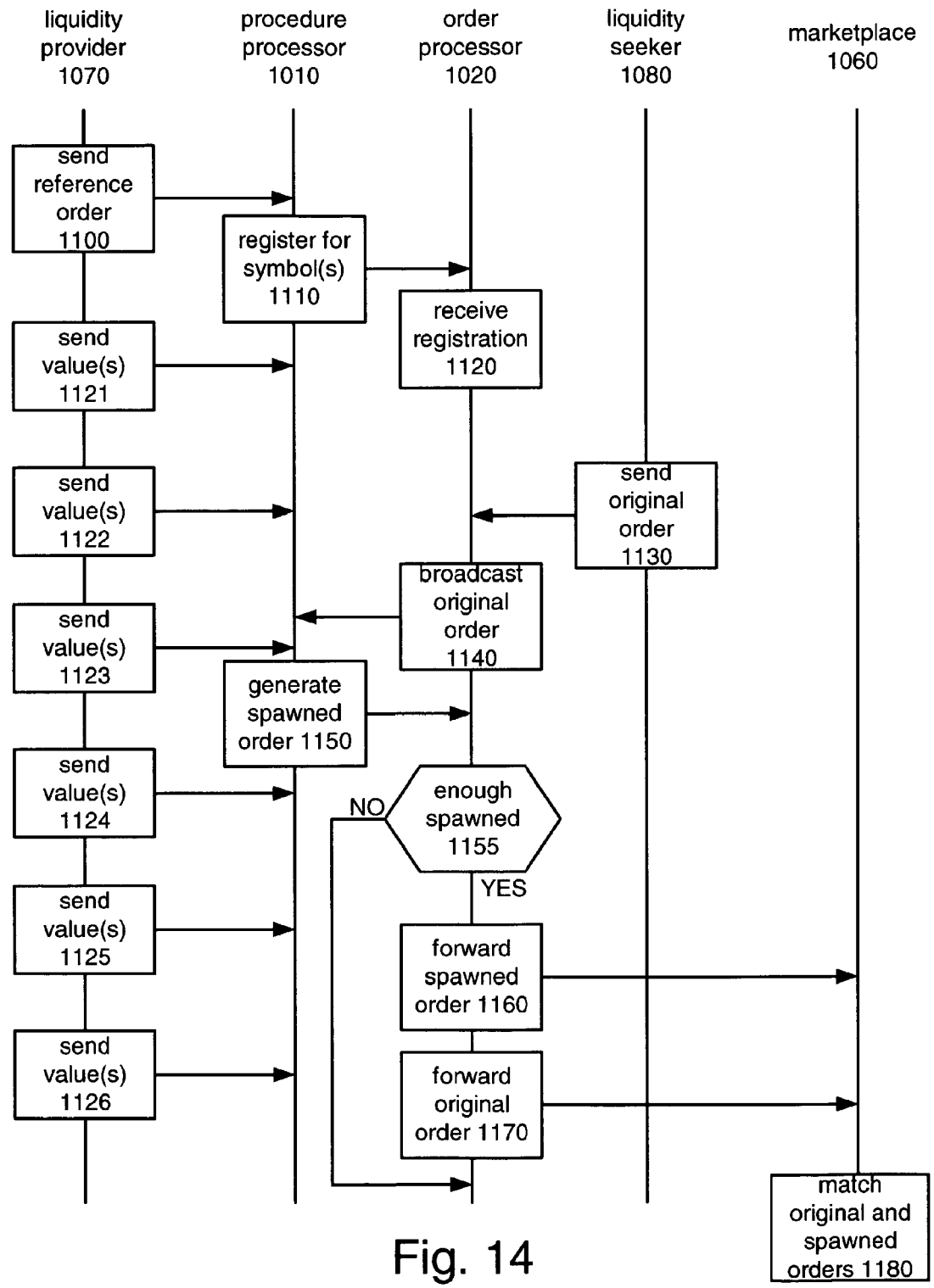
Figure 15:
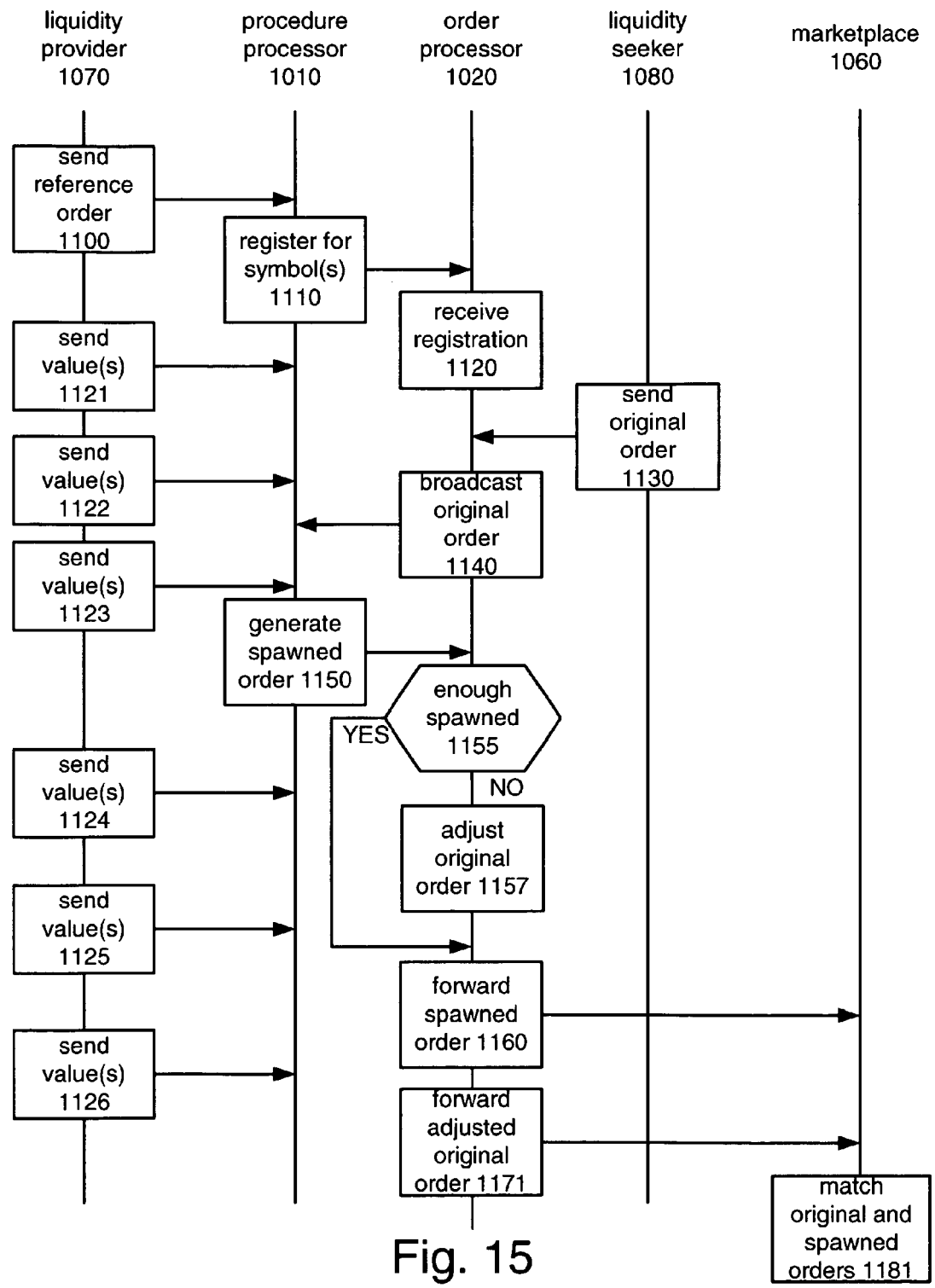
Figure 16:
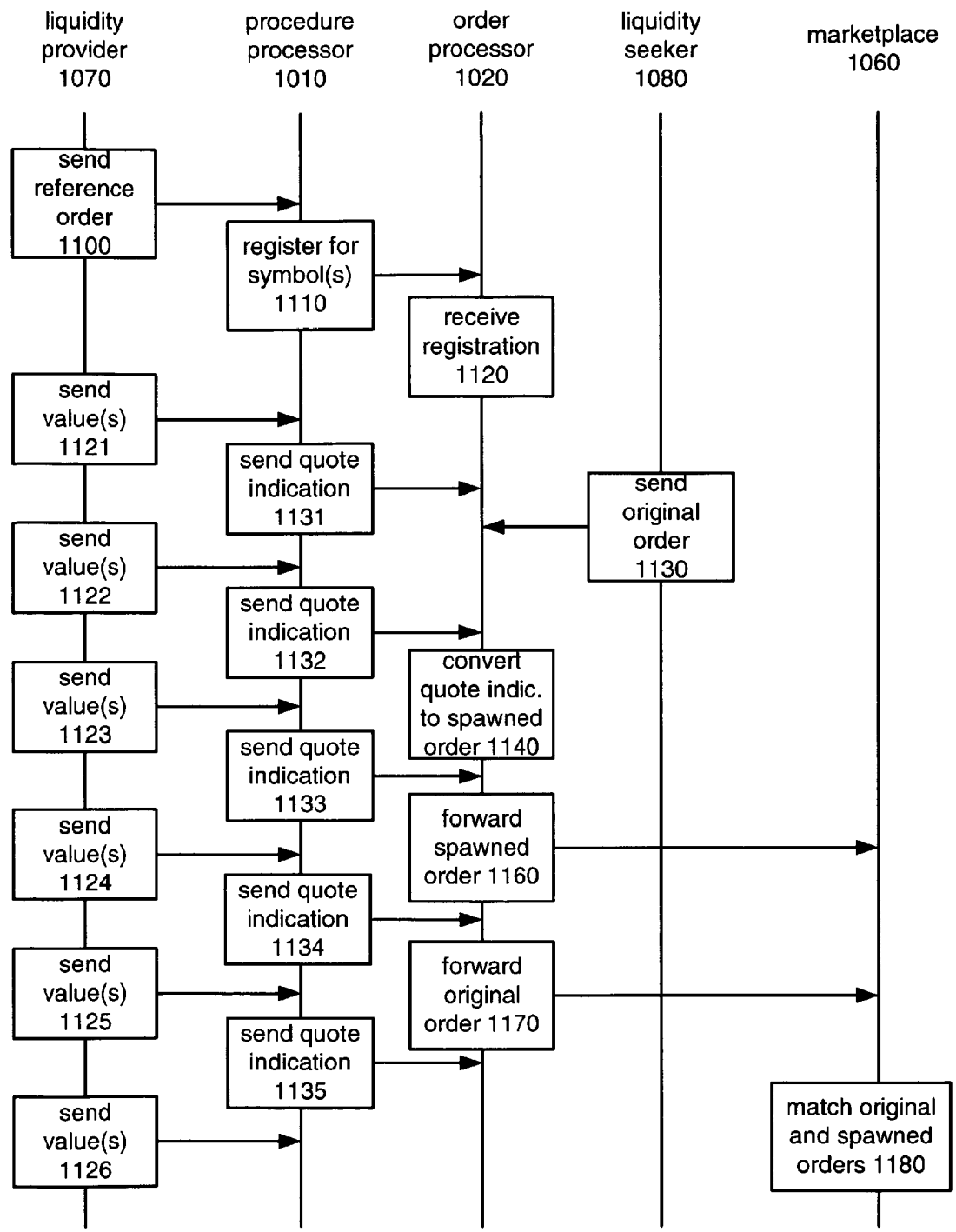

FIGS. 13-16 are flowcharts showing different use cases for system 1005. FIG. 13 shows a basic use case. FIG. 14 shows a "fill or kill" use case. FIG. 15 shows an "immediate or cancel" use case. FIG. 16 shows a quote indication use case.

Turning to FIG. 13, at step 1100, liquidity provider 1070 sends a reference order to procedure processor 1010. The reference order defines the procedure that will be executed by procedure processor 1010, such as by identifying the procedure from a library of procedures and providing initial values. At steps 1121-1126, liquidity provider 1070 sends parameters and/or values to procedure processor 1010 to control its operation, that is, to affect how procedure processor 1010 spawns orders.

At step 1110, procedure processor 1010 registers for at least one symbol at order processor 1020, to receive broadcasts from order processor 1020 relating to incoming orders for the symbol(s). At step 1120, order processor 1020 receives the registration and adjusts its list of which procedure processors should be notified of incoming orders in the symbol(s).

At step 1130, liquidity seeker 1080 sends an original order to system 1005, for transmission to marketplace 1060. For example, the original order may be "BUY 500 XYZ AT MARKET". The original order is delivered to order processor 1020. In response (not shown in FIG. 13), order processor 1020 checks whether any procedure processors are registered for the symbol of the original order, in this example, the symbol is "XYZ". If not, order processor 1020 immediately sends the original order to marketplace 1060 (not shown). On the other hand, if at least one procedure processor is registered for the symbol, then at step 1140, order processor 1020 broadcasts information about the original order, such as a copy of the original order, to each of the registered procedure processors, in this case, procedure processor 1010, and after waiting for a predetermined time interval, such as 20 milliseconds, at step 1170, order processor 1020 sends the original order to marketplace 1060.

Procedure processor 1010 receives the broadcast of the original order, and meanwhile, has been receiving updated values from liquidity provider 1070. At this point, procedure processor 1010 executes its procedure to determine whether to spawn an order, and if so, the size and price of the spawned order. At step 1150, procedure processor 1050 generates a spawned order and provides the spawned order to order processor 1020.

In a variation of this embodiment, procedure processor 1050 generates multiple spawned orders for this symbol.

In another variation of this embodiment, procedure processor 1050 generates a spawned order that is not intended to be a contra-side order for the spawned order, such as an order in a derivative marketplace or for a related instrument or symbol.

In a further variation of this embodiment, procedure processor 1050 generates a spawned order that is on the same side as the original order. To avoid front-running, the same-side spawned order is not sent to any marketplace prior to the original order being sent to a marketplace.

In yet a further variation of this embodiment, procedure processor 1050 generates at least one same-side spawned order and at least one contra-side spawned order for the symbol of the original order.

In still another variation of this embodiment, at step 1140, order processor 1020 broadcasts only partial information about the original order—instead of a copy of the original order—to each of the registered procedure processors associated with the symbol of the original order. The partial information is a selected subset of the terms of the original order. As a first example, order processor 1020 notifies procedure processor 1010 of only the size of the original order. As a second example, order processor 1020 notifies procedure processor 1010 of only the side of the original order. As a third example, order processor 1020 notifies procedure processor 1010 of only the price of the original order. As a fourth example, order processor 1020 notifies procedure processor 1010 of only the source, also referred to as the contra-party, of the original order. As a fifth example, order processor 1020 notifies procedure processor 1010 of two characteristics of the original order, the characteristics selected from the set of size, side, price, and source. In some instances of this embodiment, the amount of information about the original order that is provided by order processor 1020 to procedure processor 1010 depends on the specific characteristics that the owner of the original order—liquidity seeker 1080—has authorized for release to the owner of procedure processor 1010—liquidity provider 1070. In these instances, liquidity seeker 1080 indicates, either during a system set-up phase or by indications accompanying the original order, how much information that order processor 1020 should provide to procedures owned by different parties.

In an additional variation of this embodiment, order processor 1020 broadcasts only partial information about the original order, and procedure processor 1010 generates multiple spawned orders that are on the same-side and/or the contra-side of the original order, and are for the same symbol and/or a different symbol.

Since the spawned order is received by order processor 1020 during the predetermined delay interval of the original order, order processor 1020 forwards the spawned order to marketplace 1060.

It will be appreciated that system 1005 typically comprises many procedure processors, so that several spawned orders could be received in response to the broadcast of the original order. Order processor 1020 simply forwards these spawned orders to marketplace 1060.

It is observed that liquidity provider 1070 does not know what procedure processor is actually doing, since the activity of procedure processor 1010 also depends on receiving information from order processor 1020; nevertheless, by sending different values to procedure processor 1010, liquidity provider 1070 can exert some control over its operation.

For perspective, it is noted that, without system 1005, liquidity provider 1070 would be sending orders to marketplace 1060, pretty much in ignorance of what would actually be at marketplace 1060 when its orders arrived. In contrast, with system 1005, liquidity provider 1070 at least has some control over how procedure processor 1010 spawns an order, and the spawned order is in response to an original order that is about to arrive at marketplace 1060.

At step 1080, marketplace 1060 has received the spawned order(s) and the original order, and of course, may be receiving orders from other sources. In this example, the spawned order from procedure processor 1010 is matched by marketplace 1060 with the original order from liquidity seeker 1080 to form an executed trade. In other examples, the original order is matched by marketplace 1060 with a different contra-side order. In yet other examples, marketplace 1060 matches multiple orders with the original order to form an execution.

In a subsequent step (not shown), order processor 1020 sends a cancellation for the spawned order to marketplace 1060, to ensure that if the spawned order has not been promptly executed, it is removed from marketplace 1060. If the spawned order was executed, then the cancellation is refused by marketplace 1060 as a "too late to cancel" situation.

Turning to FIG. 14, the "fill or kill" use case is similar to that of FIG. 13, and only the differences are discussed for brevity. The term "fill or kill" is used interchangeably with the term "all or none". Specifically, at step 1155, right at the end of the predetermined interval, such as 20 milliseconds, that the original order is delayed when there is at least one interested procedure processor, order processor 1020 determines whether there is enough quantity of spawned orders to completely fill the original order. If so, at steps 1160 and 1170, the spawned orders and original order are sent to marketplace 1060, as in FIG. 13. If not, then the original order and spawned order and cancelled by order processor 1020, nothing is sent to marketplace 1060, and liquidity seeker 1080 is notified by order processor 1020 that its order could not be filled.

For liquidity seeker 1080, a "fill or kill" order to system 1005 is useful as it almost guarantees that marketplace 1060 will execute the original order, reducing the exposure that liquidity seeker 1080 experiences at marketplace 1060.

Turning to FIG. 15, the "immediate or cancel" use case is similar to the "fill or kill" use case of FIG. 14, and only the differences are discussed for brevity. At step 1155, order processor 1020 determines whether there is enough quantity of spawned orders to completely fill (match with) the original order. If so, the original and spawned orders are sent to marketplace 1060. If there is insufficient quantity of spawned orders to completely fill the original order, then at step 1157, order processor 1020 adjusts the quantity of the original order to match the quantity of spawned orders, thereby cancelling the portion of the original order that is unfilled by spawned orders, and then the adjusted original and spawned orders are sent to marketplace 1060.

Turning to FIG. 16, the quote indication use case is similar to that of FIG. 13, and only the differences are discussed for brevity.

As used herein and in the claims, a quote indication is an expression of readiness to buy and/or sell up to a named quantity of a named symbol at a named price, the expression being provided for the exclusive and private use of order processor 1020. Generally, a quote is understood to be for publication, whereas a quote indication is not for publication.

As shown in FIG. 16, each time that procedure processor 1010 receives a value update from liquidity provider 1070, procedure processor 1010 computes a new quote indication and sends it to order processor 1020. The quote indication can be one-sided, that is, only to buy or only to sell, or can be two-sided, that is, a buy quantity and price as well as a sell quantity and price.

In this case, after order processor 1020 receives a new original order, at step 1140, order processor 1020 compares the original order with the quote indication and, when appropriate, converts the most recent quote indication from procedure processor 1010 into a spawned order. The conversion occurs as follows:
symbol of spawned order=symbol of original order;
side of spawned order=contra to side of original order;
price of spawned order=price in quote for that side;
size of spawned order=minimum (quote size, size of original order).

For example, assume that the quote is "XYZ: BUY 500 AT 20.20 SELL 600 AT 20.30", and the original order is "BUY 300 XYZ AT MARKET". Order processor 1020 converts the quote to a spawned order from procedure processor 1010 with parameters "SELL 300 XYZ AT 20.30". As in FIG. 13, the spawned and original orders are forwarded to marketplace 1060 at steps 1160 and 1170.

In a variation, the conversion occurs as above, except
size of spawned order=quote size In some embodiments, the quote indication specifies the marketplaces where it can be used, and/or the liquidity seekers that can benefit from ("hit" or "take" the quote). This specificity enables replication of the private arrangements that currently exists between market participants, for example, when a broker gives preferential rates or treatment to a high volume customer.

Order processor 1020 does not convert the quote indication to a spawned order when inappropriate, such as when the price of the quote indication and the price of the original order do not intersect, when the original order is destined for a marketplace where the quote indication is not applicable, or when the source of the original order disqualifies the original order from benefiting from the quote indication.

The quote indication case illustrated in FIG. 16 is useful to liquidity provider 1070 when the market is extremely fast moving; that is, liquidity provider 1070 always has a response and is not blocked due to computation speed on the part of procedure processor 1010.

In another embodiment, the "fill or kill" feature of an original order, as shown in FIG. 14, is combined with the quote indication feature, as shown in FIG. 16.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of routing an original order, comprising:
   receiving, by a software program executing on a computer processor, from a liquidity seeker, the original order that is en route to an order execution facility,
   electronically delaying, by the software program executing on the computer processor, the original order,
   transmitting, by the software program executing on the computer processor, information based on the original order to a procedure associated with a liquidity provider so that the procedure can determine whether to generate a spawned order based on whether a trigger condition is satisfied, the liquidity seeker and the liquidity provider being different entities, and sending, by the software program executing on the computer processor, the original order to the order execution facility essentially contemporaneously with sending of the spawned order to a destination.

2. The method of claim 1, wherein the procedure represents an order handling strategy confidential to the liquidity provider.

3. The method of claim 1, wherein the procedure is located on the premises of the order execution facility.

4. The method of claim 1, further comprising receiving at least one of a value and a parameter from the liquidity provider for use by the procedure.

5. The method of claim 1, wherein the procedure determines whether to generate a spawned order by comparing the information relating to the original order with a trigger condition.

6. The method of claim 1, wherein at least one parameter or value of the spawned order is based on at least one parameter or value of the information relating to the original order.

7. The method of claim 1, further comprising providing market data to the procedure, and wherein the procedure determines whether to generate a spawned order in accordance with the market data.

8. The method of claim 1, further comprising sending information to the liquidity provider, the information consisting of only execution reports relating to the spawned order and status reports relating to the procedure.

9. The method of claim 1, wherein the spawned order is prevented from being on the same side as the original order, the side being either buy side or sell side.

10. The method of claim 1, wherein the spawned order is on the same side as the en route order, the side being either buy side or sell side.

11. The method of claim 1, further comprising automatically sending a cancellation of the spawned order to the destination after a predetermined time period.

12. The method of claim 1, wherein the spawned order is sent to the marketplace before the original order is sent to the marketplace.

13. The method of claim 1, wherein the information provided to the procedure about the original order is a copy of the order.

14. The method of claim 1, wherein the information provided to the procedure about the original order is a selected subset of the terms of the original order.

15. The method of claim 1, further comprising determining whether the quantity of the spawned order is at least equal to the quantity of the original order, and when the determination is negative, cancelling the spawned order and the original order.

16. The method of claim 1, further comprising determining whether the quantity of the spawned order is at least equal to the quantity of the original order, and when the determination is negative, adjusting the quantity of the original order to be equal to the quantity of the spawned order.

17. The method of claim 1, further comprising receiving a quote indication that is updated based on at least one parameter sent by the liquidity provider without knowledge of the original order, and wherein the determination of whether to generate a spawned order includes comparing the quote indication with the information relating to the en route order, and further comprising converting the quote indication to a spawned order.

18. The method of claim 1, wherein the spawned order and the original order are for respectively different securities.

19. The method of claim 1, wherein the destination is the order execution facility.

20. The method of claim 1, wherein the destination is other than the order execution facility.

21. A method of spawning a new order, comprising:
receiving, by a software program executing on a computer processor, the software program being associated with a liquidity provider, information about an original order en route to an order execution facility, determining, by the software program executing on the computer processor, whether to spawn a new order as a function of the information about the original order and confidential data from the liquidity provider, spawning, by the software program executing on the computer processor, the new order when the determination is positive, determining, by the software program executing on the computer processor, whether the quantity of the new order is at least equal to the quantity of the original order, and when the determination is negative, adjusting, by the software program executing on the computer processor, the quantity of the original order to be equal to the quantity of the new order, and sending, by the software program executing on the computer, the new order to a destination without delay.

22. The method of claim 21, wherein the software program executing on the computer is located on the premises of the order execution facility.

23. The method of claim 21, further comprising sending information to the liquidity provider, the information consisting of only execution reports relating to the new order and status reports relating to the procedure.

24. The method of claim 21, wherein the new order is prevented from being on the same side as the original order, the side being either buy side or sell side.

25. The method of claim 21, further comprising automatically sending a cancellation of the new order to the destination after a predetermined time period.

26. The method of claim 21, wherein the new order and the original order are for respectively different securities.

27. The method of claim 21, wherein the destination is the order execution facility.

28. The method of claim 21, wherein the destination is other than the order execution facility.

29. A method of spawning a new order, comprising:
receiving, by a software program executing on a computer processor, the software program being associated with a liquidity provider, information about an original order en route to an order execution facility, determining, by the software program executing on the computer processor, whether to spawn a new order as a function of the information about the original order and confidential data from the liquidity provider, spawning, by the software program executing on the computer processor, the new order when the determination is positive, determining, by the software program executing on the computer processor, whether the quantity of the new order is at least equal to the quantity of the original order, and when the determination is negative, cancelling, by the software program executing on the computer processor, the new order and the original order, and sending, by the software program executing on the computer processor, the new order to a destination without delay.

30. The method of claim 29, wherein the software program executing on the computer is located on the premises of the order execution facility.

* * * * *